May 1, 1923.

A. J. HOLMAN 1,453,462

LENS ADJUSTING MEANS

Filed Dec. 2, 1921

INVENTOR=
Arthur J. Holman
By Franklin P. Phillips Jr.
ATTORNEY=

May 1, 1923.
A. J. HOLMAN
1,453,462
LENS ADJUSTING MEANS
Filed Dec. 2, 1921
5 Sheets-Sheet 2
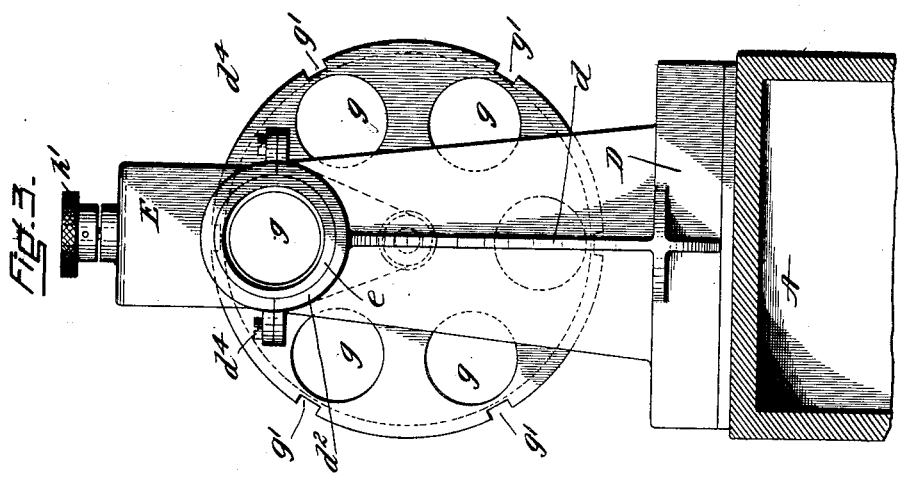
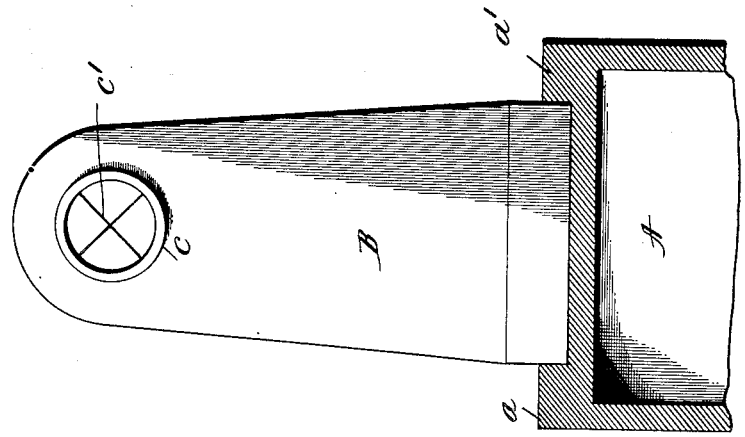
INVENTOR:
Arthur J. Holman
By Franklin F. Phillips Jr
ATTORNEY=

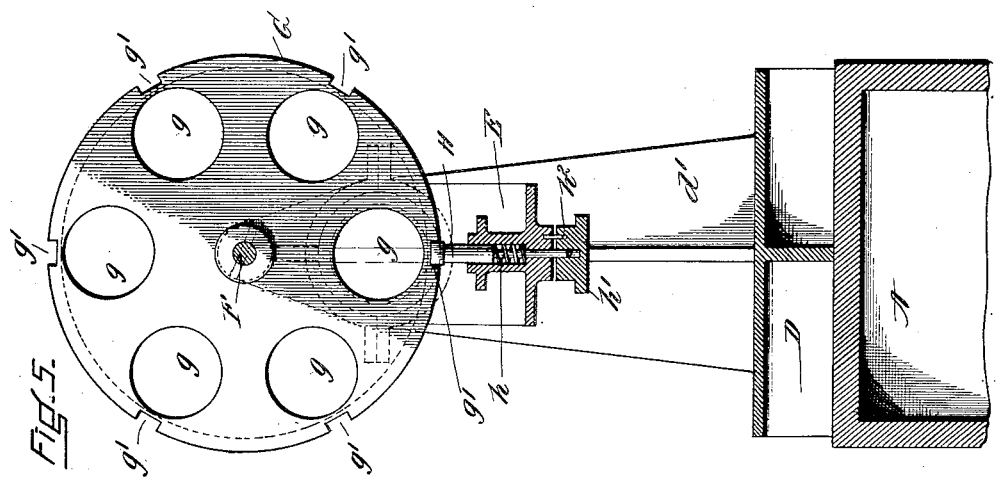
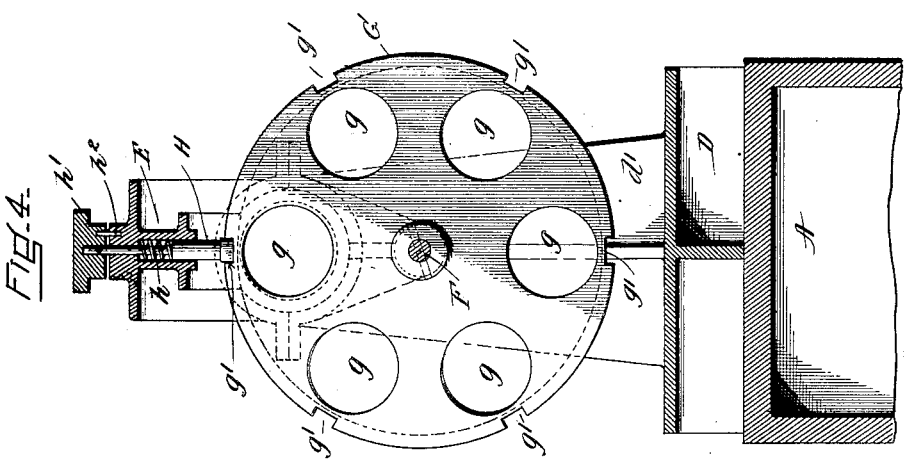

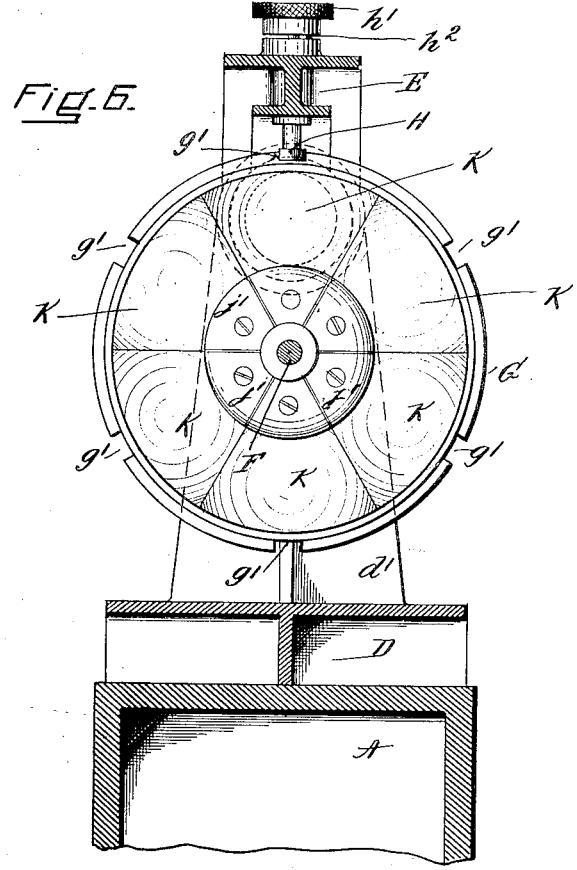
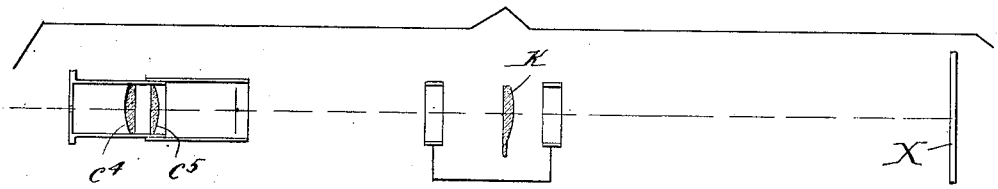

May 1, 1923.

A. J. HOLMAN 1,453,462

LENS ADJUSTING MEANS

Filed Dec. 2, 1921

INVENTOR:
Arthur J. Holman
By Franklin F. Phillips Jr.
ATTORNEY

Patented May 1, 1923.

1,453,462

UNITED STATES PATENT OFFICE.

ARTHUR J. HOLMAN, OF BOSTON, MASSACHUSETTS, ASSIGNOR TO MOTION PICTURE IMPROVEMENT COMPANY, A CORPORATION OF MASSACHUSETTS.

LENS-ADJUSTING MEANS.

Application filed December 2, 1921. Serial No. 519,477.

*To all whom it may concern:*

Be it known that I, ARTHUR J. HOLMAN, a citizen of the United States, residing at Boston, in the county of Suffolk and Commonwealth of Massachusetts, have invented a certain new and useful Improvement in Lens-Adjusting Means, of which the following is a specification.

My invention relates to a device which has for its object the correct setting of a multiplicity of lenses each forming a sector of a disk which is used as a rotatable member for the purpose of providing an optical rectifier, as for example, to compensate for the movement of the film strip in moving picture machines of the continuous projector type such as that shown in Letters Patent of the United States No. 1,356,787 to Edwin F. Porter, dated October 26, 1920, wherein the rotatable disks are formed of sectors of plane prisms instead of lenses. In such a device it is necessary that every lens sector be accurately adjusted in such a position that the optical center of each may lie on a common circle and that the spacing between optical centers be equal. The center of the common circle must be the center of the shaft upon which the disk rotates. Any inaccuracy of adjustment will result in a fluctuation of images and lack of definition of images. Hence it has been the object of my invention to provide a simple and accurate means of determining and correcting error of adjustment in the relative positions of the several optical centers of a rotatable disk of the character described.

My device may be best understood by reference to the accompanying drawings in which—

Fig. 2 is an end view on line 2—2 of Fig. 1.

Fig. 3 is an end view on line 3—3 of Fig. 1.

Fig. 4 is a cross-section on line 4—4 of Fig. 1.

Fig. 5 is a cross-section on line 4—4 showing the rotatable element as rotated 180° from the position shown in Fig. 4.

Fig. 6 is a cross-section on line 6—6 of Fig. 1.

Fig. 7 is a diagram of the general focal arrangement.

Figs. 8, 9, 10, 11, 12, and 13 illustrate in diagrammatic form the method of operation of my device in a manner to be later described.

Referring now more specifically to the drawings A is a base which is provided with flanges $a$ and $a^1$ between which is slidably mounted frame B, the upper part of which has projections $b$ and $b^1$. Fixedly mounted in projection $b^1$ is a tube C within which is inserted a tube $c$ which carries a pair of cross-hairs $c^1$. Slidably mounted in projection $b$ of the frame B is a tubular eye-piece $c^2$ which enters and is slidable within tube C. The eye-piece $c^2$ is provided with a sight aperture $c^3$ and a pair of non-rectifying lenses $c^4$ and $c^5$ which are mounted in rings $c^6$ and $c^7$ which are inserted inside the tubular eye-piece $c^2$.

Mounted upon base A is also frame D which is in alignment with frame B, and which is provided with upwardly extending arms $d$ and $d^1$ which terminate in split annular bearings $d^2$ and $d^3$, the halves of which are retained by screws $d^4$. A U shaped frame E provided with projecting hollow shafts $e$ and $e^1$ is rotatably mounted in the annular bearings $d^2$ and $d^3$. The axis of the openings in the hollow shafts $e$ and $e^1$ coincide with the axis of the tubes C and $c^2$. The extremities of the U shaped frame extend beyond the hollow shafts $e$ and $e^1$ and terminate in annular bearings $e^2$ and $e^3$ within which is rotatably mounted shaft F which is retained in position by collar $f$ which is pinned to shaft F and by the hub of index-wheel G which is also pinned to shaft F. The axis of annular bearings $e^2$ and $e^3$ is parallel to the axis of hollow shafts $e$ and $e^1$ and the spacing of these axis is equal to the radius of the common circle on which the optical centers of the lens sections comprising the lens disk to be tested are designed to be set. The index-wheel G is provided with a series of circular apertures $g$ of number equal to the number of lens sections comprising the disk to be tested. The centers of the apertures $g$ lie on a circle centered upon shaft F and are equally spaced. The periphery of index-wheel G is provided with a series of notches $g^1$, each accurately located on a radius passing through the center of the adjacent aperture $g$. A stop H slidably mounted in frame E is arranged to enter any notch $g^1$ and hold the index-wheel G in a position wherein an aperture $g$ will be centered on the axis of hollow shafts $e$ and $e^1$. The stop H is normally actuated into engagement with index-wheel G by means of coil spring $h$ and a thumb piece $h^1$ is mounted on the top of the stop H where it projects above frame E for convenience in lifting the stop H out of operative position. To prevent rotation of the stop H a pin $h^2$ is fixed in the thumb piece $h^1$ and enters a corresponding hole in frame E.

Figure 1:
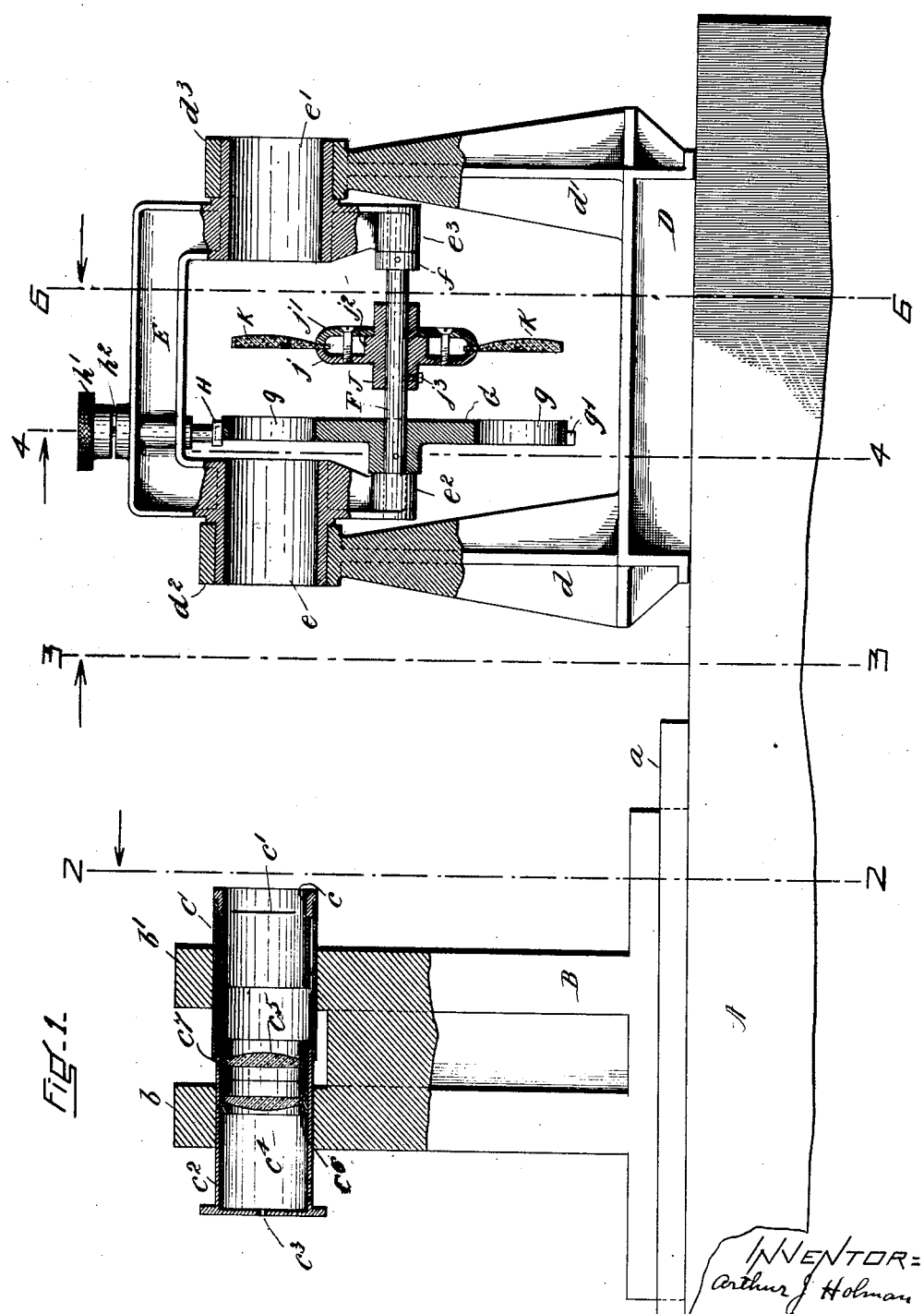
Fig. 1 is a side view of my device.
Figure 12:
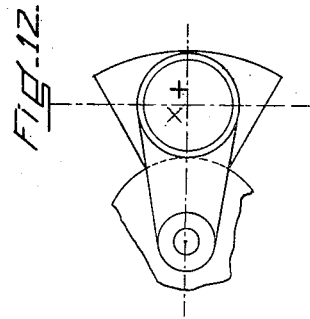
Figure 11:
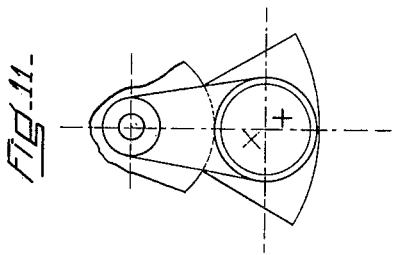

Thus far I have described my apparatus. I shall now describe the lens disk to be tested and adjusted and show its location in the apparatus. This lens disk comprises the following described arrangement of parts. A hub J is arranged to fit shaft F. This hub J is provided with an integral annular flange $j$. Opposite to flange $j$ is another flange made up of section $j^1$ of number equal to the number of lens sectors appearing in the disk. The base of each of the sections $j$ butts against the hub J and bears laterally against a shoulder $j^2$ on hub J being retained in this position by a screw $j^3$ which passes through the section $j^1$ and enters a threaded hole in the flange $j$. This construction enables the inwardly curved periphery of flange $j$ and the opposite extremity of a flange section $j^1$ to grip and retain a lens section K which has had its inner edge ground with parallel surfaces as shown in Fig. 1. The hub J is adjustably fixed to shaft F by set screw $j^3$ in such a position that the optical center of each lens sector K will lie, in the absence of error, in the axis of an adjacent aperture $g$ in index-wheel G. The determination of the existence of such error and its correction is the purpose of my apparatus as above described.

The method employed to test and adjust the setting of lens sectors is as follows: First the lens disk is placed upon shaft F and fastened thereto by the set screw $j^3$ in a position such that each lens sector roughly centers opposite an aperture $g$ in the index-wheel G. The frame E is then set in the position shown in Figs. 1 and 4 and diagrammatically in Fig. 9, the stop H being in operative position so that an aperture $g$ is in alignment with the axis of the hollow shaft $e$ and $e^1$. It will now be observed that the eye-piece $c^2$ with the lenses $c^4$ and $c^5$ together with the lens sector K form a telescope. Within the field of vision of the eye-piece $c^2$ are the pair of cross-hairs $c^1$. The telescope so formed is then directed at a target $x$ whereon appear a vertical and a horizontal line intersecting, which target is located at a convenient distance. (See Fig. 7.) The eye-piece $c^2$ is then adjusted with respect to the tube C until the cross-hairs $c^1$ are sharply defined when viewed through aperture $c^3$. The apparatus is then focused upon the target by sliding frame B upon base A until the image of the target appears in sharp focus. The aim is carefully taken by movement of base A until the image of the center of the target, namely, the point of intersection of the lines thereon, coincides with the intersection of the cross-hairs $c^1$.

Figure 9:
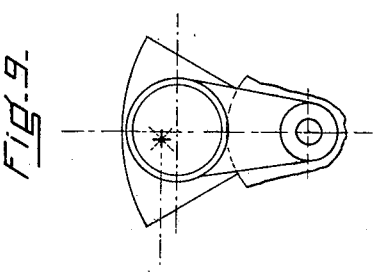
Figure 8:
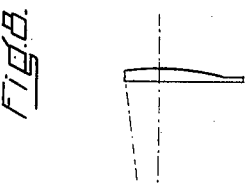

The apparatus being now set in the position shown in Figs. 1 and 4, I will assume that the optical center of the lens sector which is being tested is located off the rotational axis being above and to the left thereof as indicated by the solid cross in Fig. 9, which diagrammatically illustrates the position of the lens sector in this first position which I will call position 1. In this position the imaginary line between the intersection of the cross-hairs and the center of the target intersects the lens section at the point indicated by the dotted cross in Fig. 9. Under these conditions the dotted cross coincides with the optical center of the lens sector.

Figure 13:
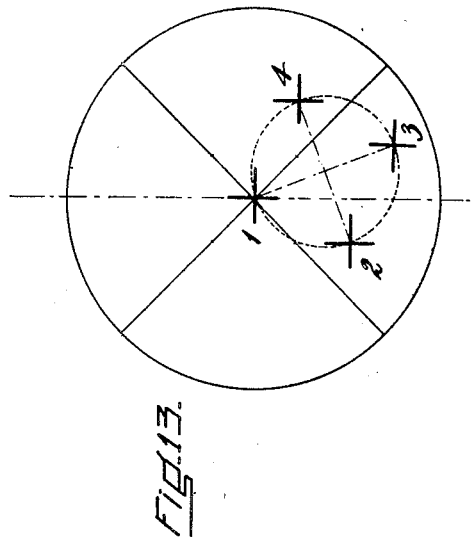

Of course in this position the observer will not see over-lying crosses as indicated in the off-set position of Fig. 9 but will see the crosses overlying in the center of the field of vision as shown at 1 in Fig. 13. As yet there is no indication of displacement of the optical center of the lens sector under test with respect to the rotational axis of the apparatus.

Figure 10:
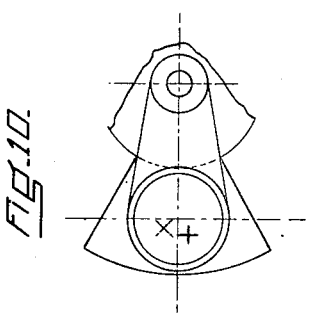

The next operation is to revolve the frame E slowly at the same time observing carefully path of the image of the center of the target which, in the supposed case, is that indicated by the dotted circle in Fig. 13. If an anti-clockwise rotation is imparted to frame E a movement of 90° will bring the image to a position indicated by 2 in Fig. 13. Fig. 10 indicates this position diagrammatically, showing the displacement of the optical center of the lens sector which has moved through an arc of 90°. The continued rotation of the frame E through successive movements of 90° will bring the image of the center of the target to the positions shown at 3 and 4 in Fig. 13 as the optical center will assume positions shown in Figs. 11 and 12. A further movement of 90° beyond position 4 will bring the image back to position 1.

It will be readily apparent that the diameter of the circular path of travel of the optical center of the lens sector is double the displacement of the optical center from its correct position for the reason that a diameter equals twice a radius. Of course this displacement is seen through eye-piece, as in Fig. 13, highly magnified. If the circle of rotation of the image of the center of the target lies below and to the right of the intersection of the cross-hairs, with the field of vision, as illustrated in Fig. 13, this will indicate that the displacement of the optical center of the lens sector with respect to the axis of rotation is above and to the left, for the reason that the eye-piece lenses are inverting or non-rectifying.

To correct the error thus discovered the first step is to rotate the frame E from its starting position, as shown in Fig. 4, 180° to the position shown in Fig. 5, in which position the image of the center of the target passes to position 3 in Fig. 13, the apparent displacement being doubled and magnified. The next step is to realign the apparatus upon the target by shifting base A until the image passes from position 3 toward position 1 one half the distance in a straight line. This halving of the distance will be facilitated if the target is made of cross-section paper having accurately ruled squares. This operation will reduce the apparent displacement of the image by one half and what is now seen by the observer is a magnified view of the actual error. To correct this error it is now necessary to readjust the lens sector in its mountings until the image of the target registers with the point of intersection of the cross-hairs. This third step is accomplished by slightly loosening its flange screw $j^3$ and shifting the position of the lens sector until the image of the center of the target appears as centered upon the intersection of the cross-hairs. A check on the operation is to again rotate frame E through 180° and observe whether the image remains centered on the cross-hairs.

With the lens sector under test now correctly positioned the index wheel G is now released from the stop H and revolved till the stop H may be inserted in the next notch $g^1$ and the process of testing and adjusting the lens sectors now brought into operative position is repeated. It will be apparent that all optical centers of the several lenses will lie on a common circle, after the adjusting process is completed, which common circle is concentric with the hub J and will be equally spaced because the establishment of these centers is obtained as a result of the successively equal stages of rotation of the lens disk secured by the accurate notching of the index wheel G.

It will be readily understood that the base A should preferably be mounted upon a support whereon it may be easily swung and tilted and clamped in any desired position. When such a mounting is provided, and the apparatus is aimed at the target to perform that step of procedure whereby the apparent displacement of the image is reduced by one half, this setting may be maintained during all succeeding operations upon the various lens sectors and all that the operator will need to do is merely successively to adjust the position of each lens sector in its retaining flanges, as his first view through each lens sector, after the first sector has been adjusted and the aim described obtained, will disclose the magnified actual error of displacement of the optical center of the lens sector under observation.

Having thus fully described by invention, what I claim is—

1. In a device of the character specified the combination with the usual elements of a telescope excepting therefrom the object lens, of cross-hairs mounted in the field of vision of the eye-piece of said telescope, and means whereby a disk the periphery of which consists of a plurality of lens sectors, may be rotatably mounted on a shaft, which shaft is revolvable about the axis of said telescope tube and parallel thereto in a manner whereby each lens sector of said disk may be positioned successively by a uniform angular rotation of said disk about said shaft to form an object lens for said telescope and when so positioned may be rotated by the revolution of said shaft about the axis of said telescope tube.

2. In a device for the purpose of testing and adjusting the position of the optical centers of lens sectors in a disk composed of a plurality of said lens sectors each designed to have its optical center equally distant from optical centers of adjacent sectors and lying on a circle having its center on the axis of rotation of the disk, the combination of an eye-piece provided with optical elements, cross-hairs in the field of vision of said eye-piece, a support for a rotatable frame, a hollow shaft upon which said frame is arranged to rotate on said support, the bore through said shaft being aligned with said eye-piece, a shaft carried by said frame parallel to said bore and spaced at a distance therefrom equal to the radius of said circle, an index wheel provided with apertures, a releasable stop arranged normally to contact with and prevent the rotation of said wheel and means on said wheel to engage said stop, said means being uniformly spaced and of number equal to the number of said lens sectors.

In witness whereof I have hereunto affixed my signature.

ARTHUR J. HOLMAN.